Figure 5:
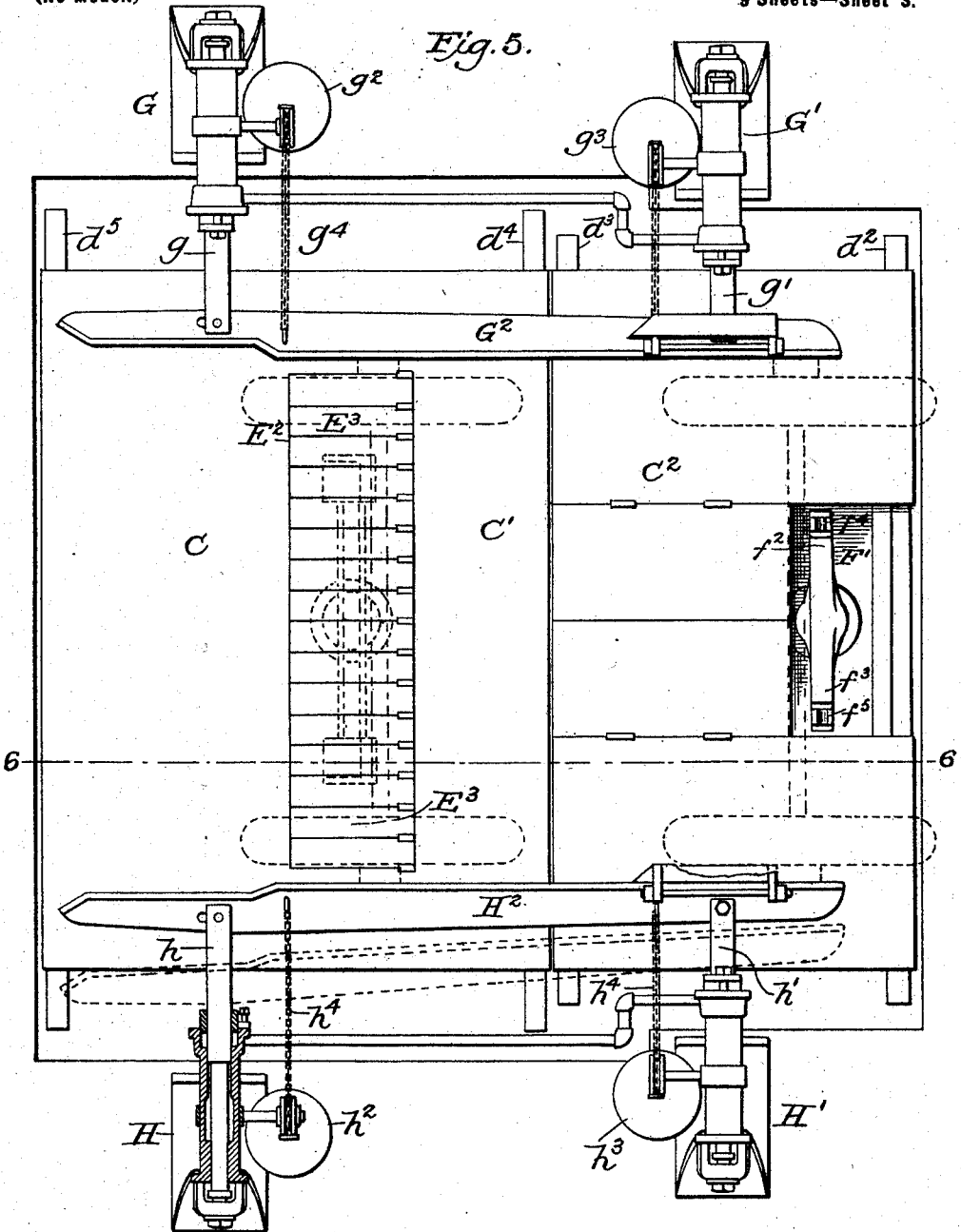

No. 682,973. Patented Sept. 17, 1901.
G. H. CONDICT.
SYSTEM AND APPARATUS FOR LOADING AND UNLOADING STORAGE BATTERIES FROM MOTOR VEHICLES.
(Application filed Oct. 19, 1898. Renewed July 29, 1901.)
(No Model.) 9 Sheets—Sheet 1.
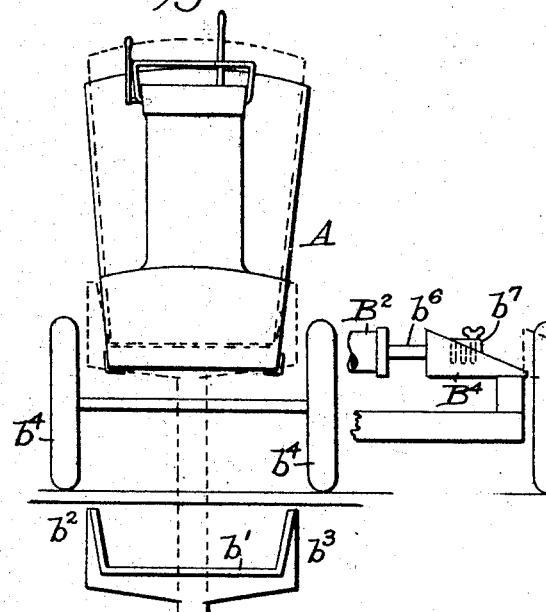
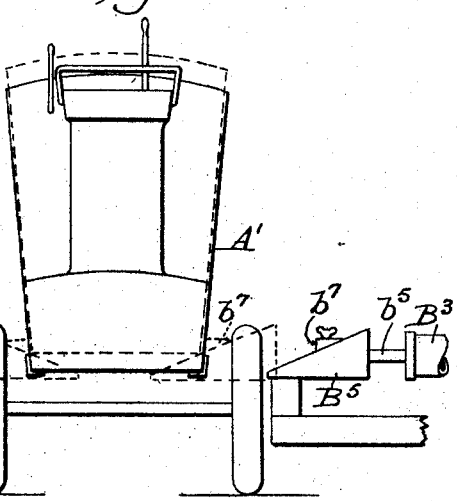
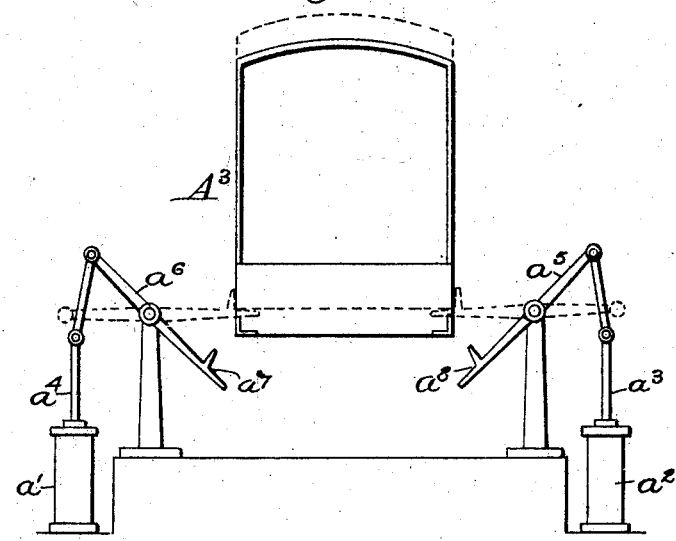
WITNESSES
INVENTOR
George Herbert Condict,
BY
ATTORNEY No. 682,973. Patented Sept. 17, 1901.
G. H. CONDICT.
SYSTEM AND APPARATUS FOR LOADING AND UNLOADING STORAGE BATTERIES FROM MOTOR VEHICLES.
(Application filed Oct. 19, 1898. Renewed July 29, 1901.)
(No Model.) 9 Sheets—Sheet 2.
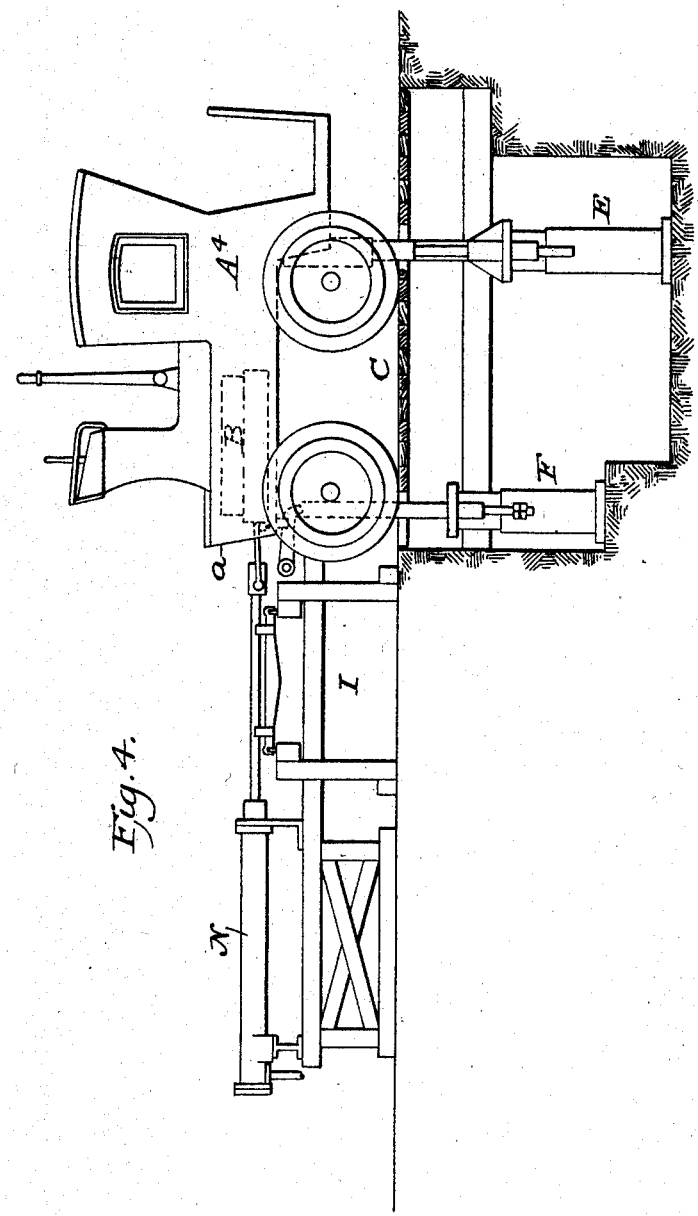
WITNESS
James F. Duhamel
INVENTOR,
George Herbert Condict,
BY
Frankland Jannus
ATTORNEY No. 682,973. Patented Sept. 17, 1901.
G. H. CONDICT.
SYSTEM AND APPARATUS FOR LOADING AND UNLOADING STORAGE BATTERIES FROM MOTOR VEHICLES.
(Application filed Oct. 19, 1898. Renewed July 29, 1901.)
(No Model.) 9 Sheets—Sheet 3.

WITNESSES
INVENTOR
George Herbert Condict,
BY
ATTORNEY

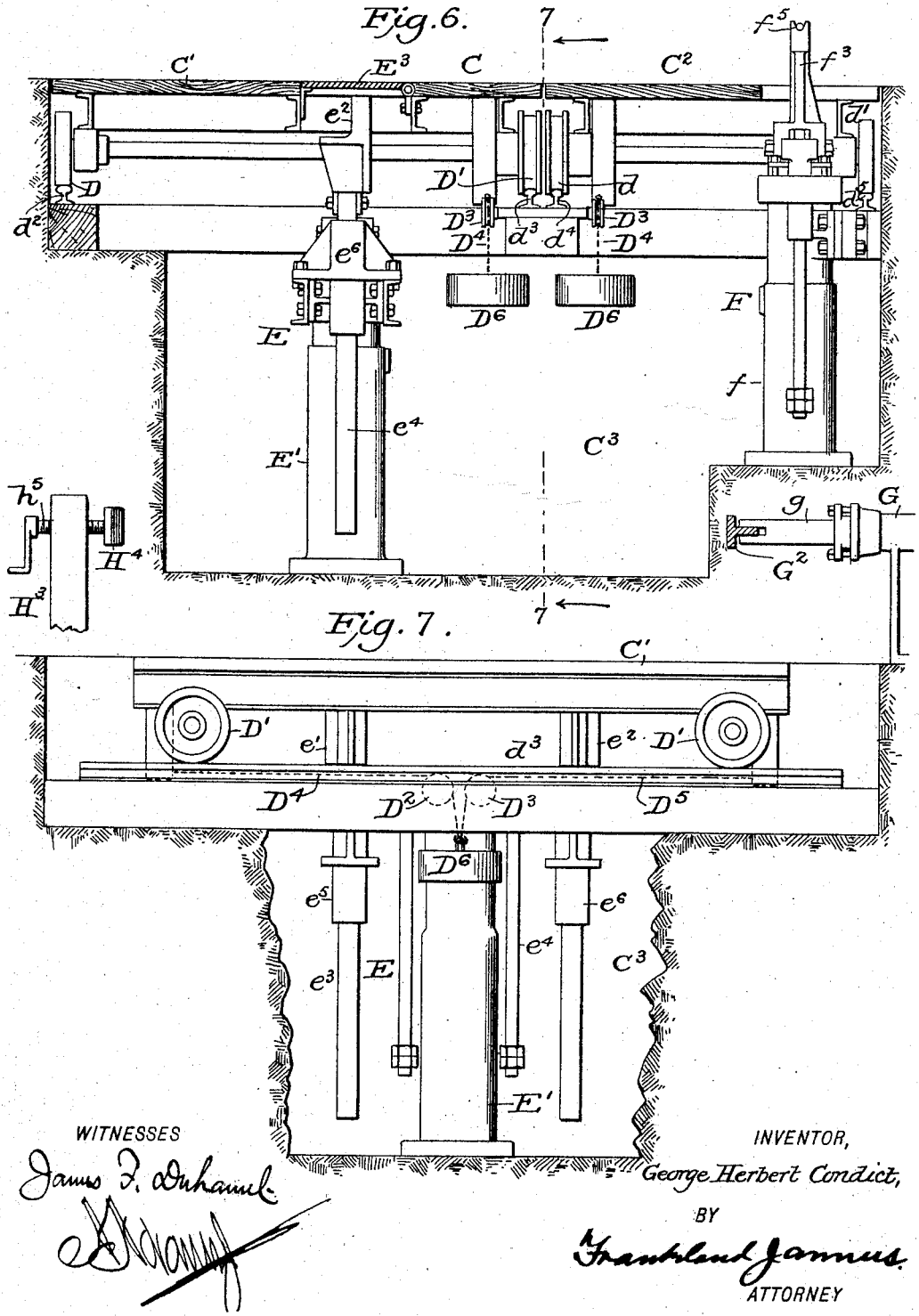

No. 682,973. Patented Sept. 17, 1901.
G. H. CONDICT.
SYSTEM AND APPARATUS FOR LOADING AND UNLOADING STORAGE BATTERIES FROM MOTOR VEHICLES.
(Application filed Oct. 19, 1898. Renewed July 29, 1901.)
(No Model.) 9 Sheets—Sheet 5.
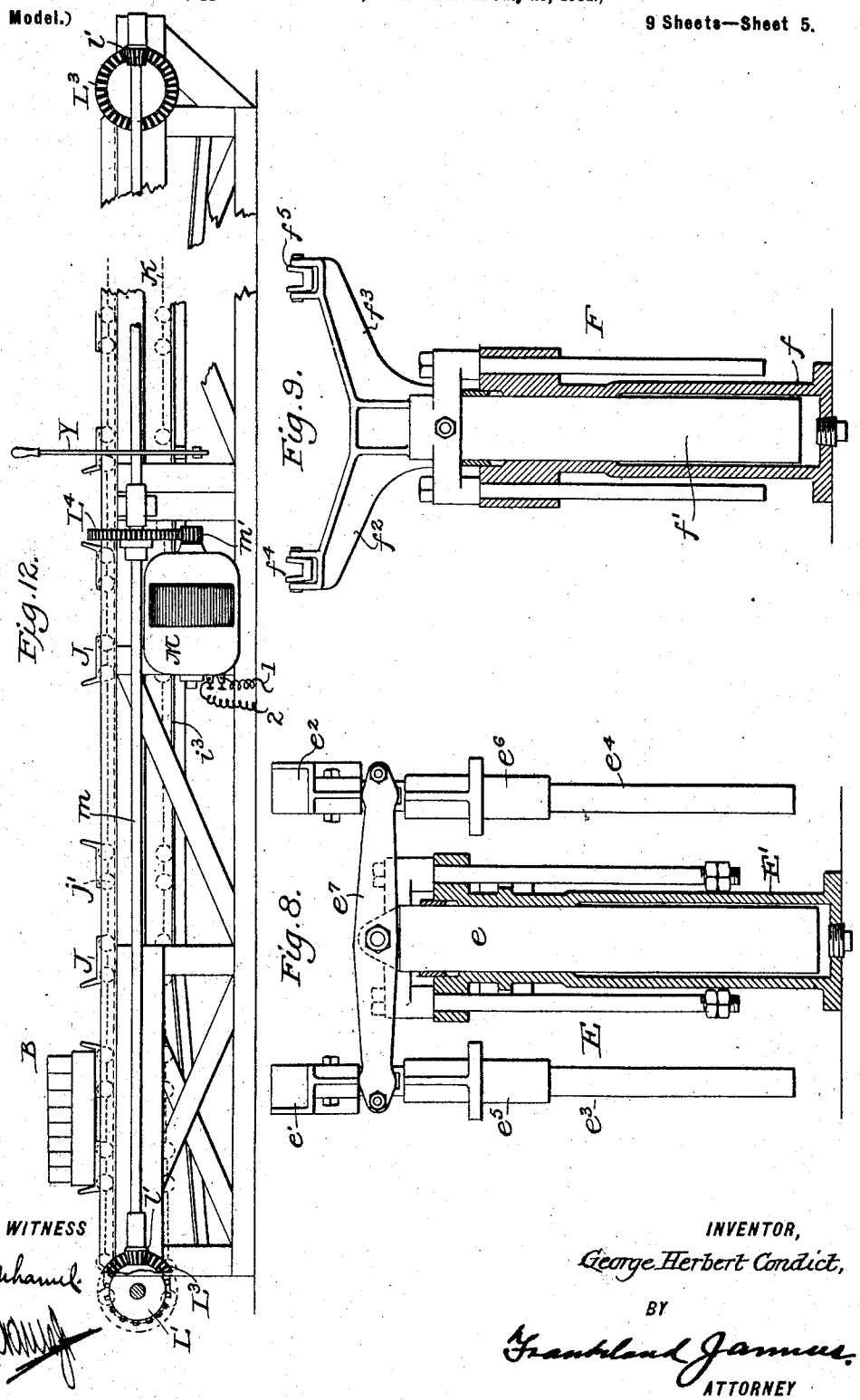
WITNESS
INVENTOR,
George Herbert Condict,
BY
ATTORNEY No. 682,973. Patented Sept. 17, 1901.
G. H. CONDICT.
SYSTEM AND APPARATUS FOR LOADING AND UNLOADING STORAGE BATTERIES FROM MOTOR VEHICLES.
(Application filed Oct. 19, 1898. Renewed July 29, 1901.)

(No Model.) 9 Sheets—Sheet 6.

WITNESSES
INVENTOR
George Herbert Condict,
BY
Frankland Jannus.
ATTORNEY

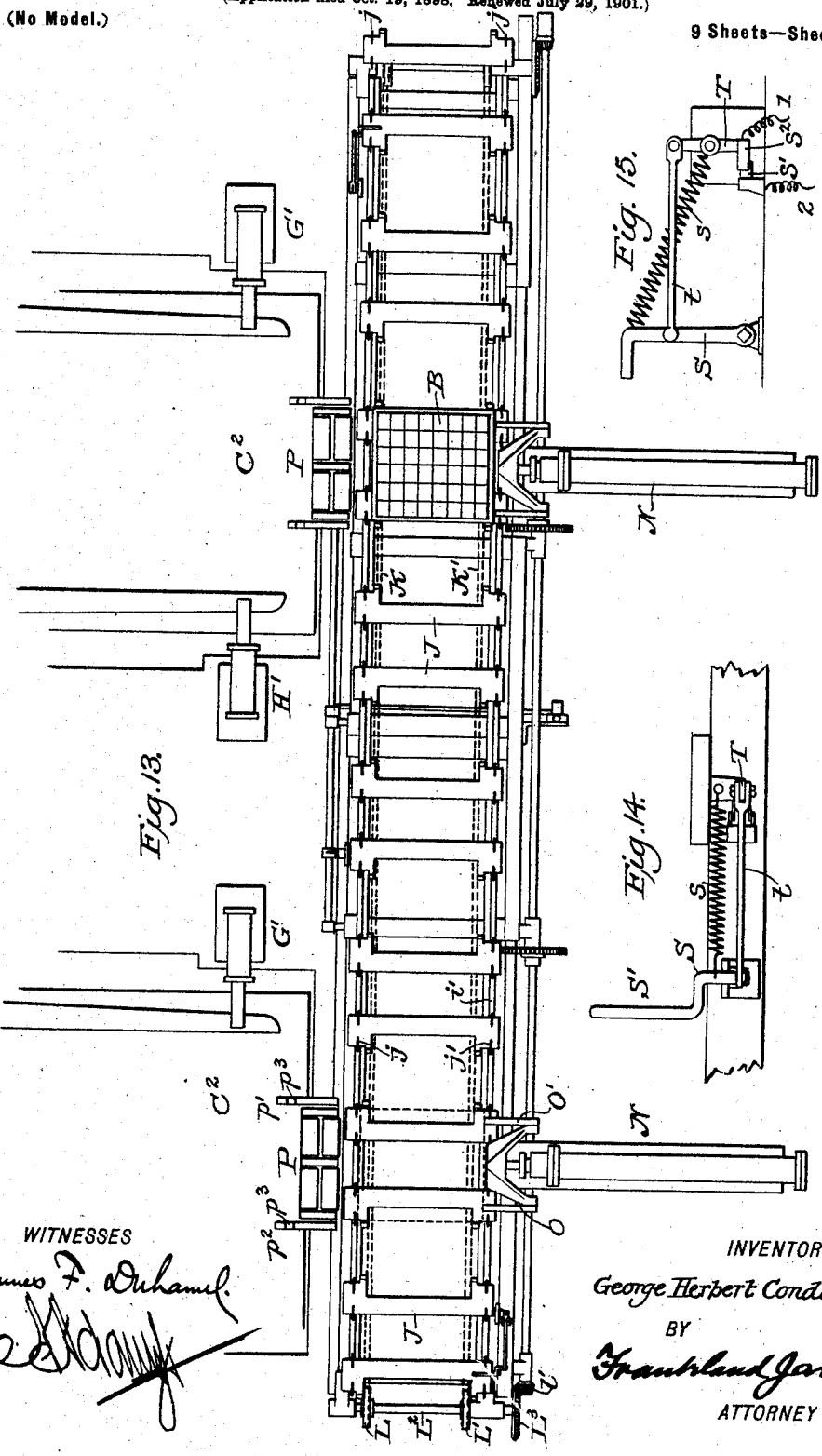

No. 682,973. Patented Sept. 17, 1901.
G. H. CONDICT.
SYSTEM AND APPARATUS FOR LOADING AND UNLOADING STORAGE BATTERIES FROM MOTOR VEHICLES.
(Application filed Oct. 19, 1898. Renewed July 29, 1901.)
(No Model.) 9 Sheets—Sheet 8.
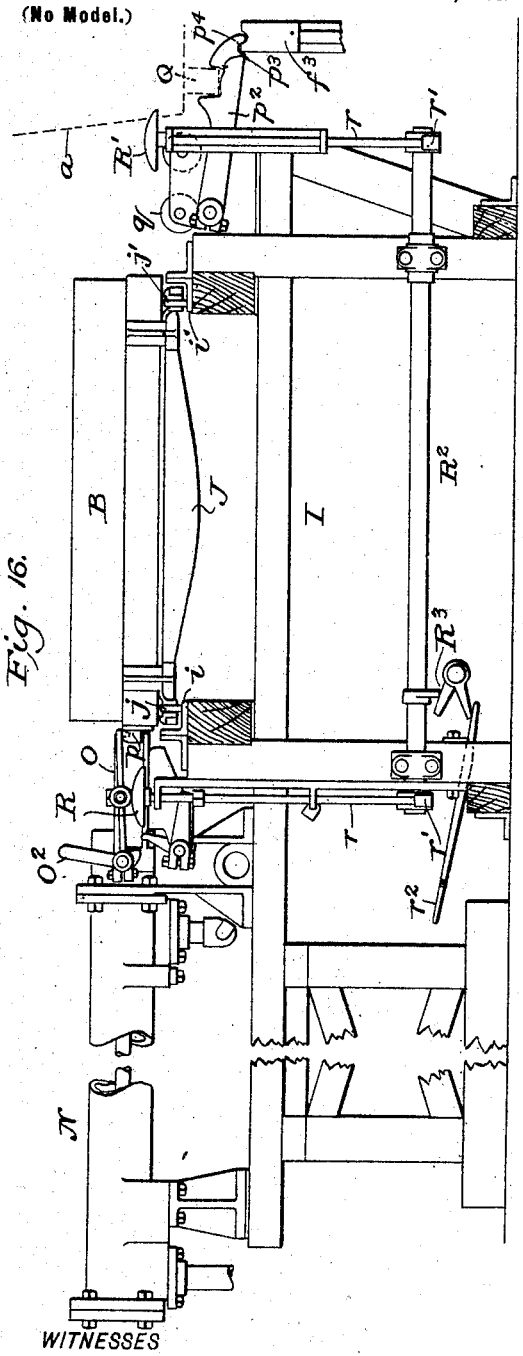
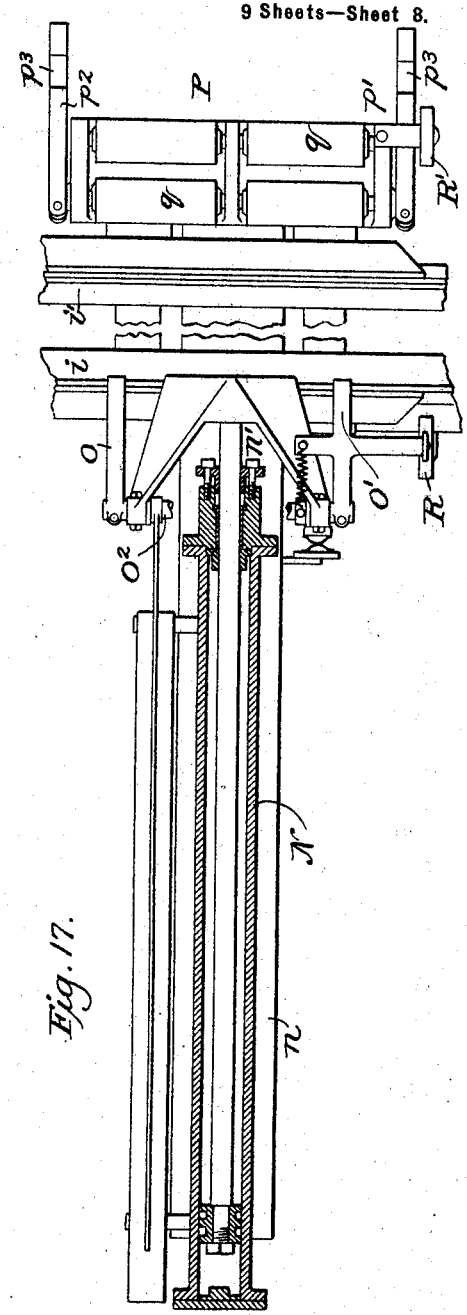
WITNESSES
INVENTOR,
George Herbert Condict,
BY
ATTORNEY No. 682,973. Patented Sept. 17, 1901.
G. H. CONDICT.
SYSTEM AND APPARATUS FOR LOADING AND UNLOADING STORAGE BATTERIES FROM MOTOR VEHICLES.
(Application filed Oct. 19, 1898. Renewed July 29, 1901.)
(No Model.)
9 Sheets—Sheet 9.
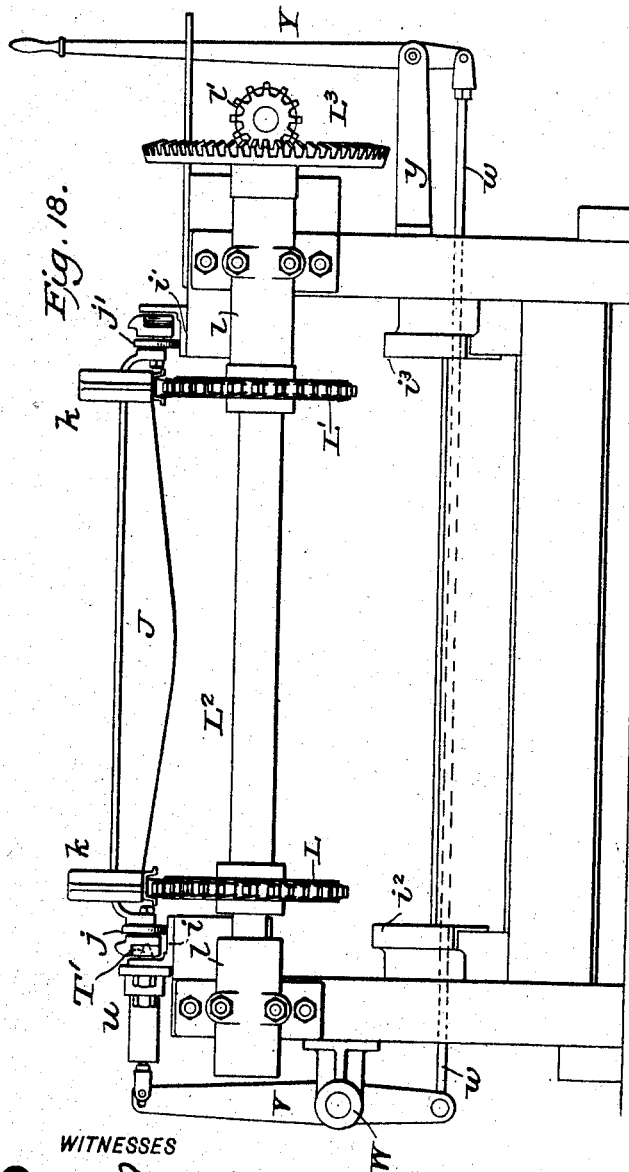
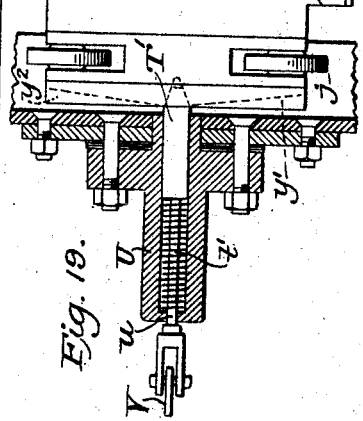
WITNESSES
INVENTOR
George Herbert Condict,
BY
ATTORNEY

UNITED STATES PATENT OFFICE.

GEORGE HERBERT CONDICT, OF NEW YORK, N. Y., ASSIGNOR TO THE ELECTRIC VEHICLE CO., OF SAME PLACE.

SYSTEM AND APPARATUS FOR LOADING AND UNLOADING STORAGE BATTERIES FROM MOTOR-VEHICLES.

SPECIFICATION forming part of Letters Patent No. 682,973, dated September 17, 1901.

Application filed October 19, 1898. Renewed July 29, 1901. Serial No. 70,115. (No model.)

*To all whom it may concern:*

Be it known that I, GEORGE HERBERT CONDICT, a citizen of the United States of America, and a resident of New York, in the county of New York and State of New York, have invented certain new and useful Improvements in Systems and Apparatus for Loading and Unloading Storage Batteries from Motor-Vehicles, of which the following is a specification.

My invention relates to a new and improved system of loading and unloading storage batteries from motor-vehicles which are fitted with electric motors arranged to propel the vehicle when energized by current supplied from batteries carried thereby.

The invention also includes various mechanical contrivances designed, constructed, and arranged to embody the invention and form parts thereof.

According to the present system I provide mechanical means for placing the vehicle to be loaded or unloaded in definite predetermined position with respect to loading apparatus, and this positioning of the vehicle I term "centering," by which term this portion of the operation will be hereinafter referred to.

The vehicles to be supplied with storage batteries vary in construction and in type of their kind; but they are all of the dirigible type—that is to say, they do not run on tracks nor are they automatically guided, but are manually directed, governed, or steered, some of them carrying the battery in a space below the vehicle between the wheels, into which the battery is placed from below, and others being provided with a battery-box in the rear of the vehicle, into which the load of batteries is placed from the rear and in a horizontal plane. In some instances the vehicle is placed upon a laterally-movable loading-table and then moved with the table into the predetermined position by appropriate apparatus; but the battery may be placed in the vehicle by hand or with the assistance of any desired mechanism.

Apparatus for performing the various operations of loading and unloading by mechanical means is hereinafter described and illustrated, together with apparatus for centering the vehicle irrespective of the mechanism by which it is loaded.

The vehicle may be centered by means of a single ram or elevating device extending upward underneath the vehicle and engaging it from below by sloping or wedge-shaped parts between which the body of the vehicle will rest in a predetermined position. The body of the vehicle may also be brought to a predetermined position or centered by wedge-shaped blocks forced under the body from the sides, or the same result may be accomplished by means of swinging levers engaging the body of the vehicle from opposite sides and bringing it to a predetermined position between them. The centering apparatus may also be in the form of horizontally-moving rams arranged at one or both sides of the vehicle to push it into the desired position. All of these forms are hereinafter illustrated and described, together with an arrangement in which two sets of rams are employed in connection with a laterally-moving loading-table arranged to receive the vehicle, and in this connection an auxiliary apparatus for handling a load of storage batteries and for loading and unloading the vehicle will be described and claimed.

When used in connection with loading and unloading apparatus of the type hereinafter referred to, the vehicle is provided with a battery-box, which opens at the end and carries the batteries in a tray removable therefrom in a horizontal plane. Immediately adjacent to the rear end of the loading-table, where the open end of the battery-box upon the vehicle is located, is a transfer-table, which extends at right angles to the loading-table and is greater in length than the width of the table and the vehicle upon it. At one or both sides of the loading-table are hydraulic rams, which when extended engage and press laterally against the hubs of the vehicle and move both it and the table until the vehicle is in a predetermined position with respect to the transfer-table. Other hydraulic rams are provided below the loading-table and project upward through openings therein, and when the vehicle has been centered by the side rams the vertically-moving rams are brought into action to slightly raise the vehicle until the battery-box thereof is in a proper horizontal plane with respect to the transfer-table. The transfer-table is provided with a traveling chain or chains, upon which are secured carriers. The chains are propelled in either direction by a suitable motor, and automatic stops are provided, which are arranged to hold the chains at predetermined points. The storage batteries to be handled are contained in trays of substantially uniform size, and the carriers upon the chains are spaced to receive and hold the trays of batteries (the loads) between them. The automatic catches are so placed as to engage the chains when the tray of storage battery is directly opposite to the battery-box of the vehicle to be loaded, and conversely a set of carriers opposite to the battery-box to be unloaded. A hydraulic ram is located on the side of the transfer-table opposite to the battery-box upon the vehicle when the latter is in position and is adapted to thrust a tray of battery from the transfer-table into the battery-box on the vehicle or to draw a tray of battery from the vehicle onto the transfer-table between the carriers upon the traveling chains, which have previously been positioned to receive it. When the vehicle has been loaded, the side rams are withdrawn and the elevating-rams are lowered, when the vehicle is run off the table, which then automatically centers itself ready for future use.

Figure 10:
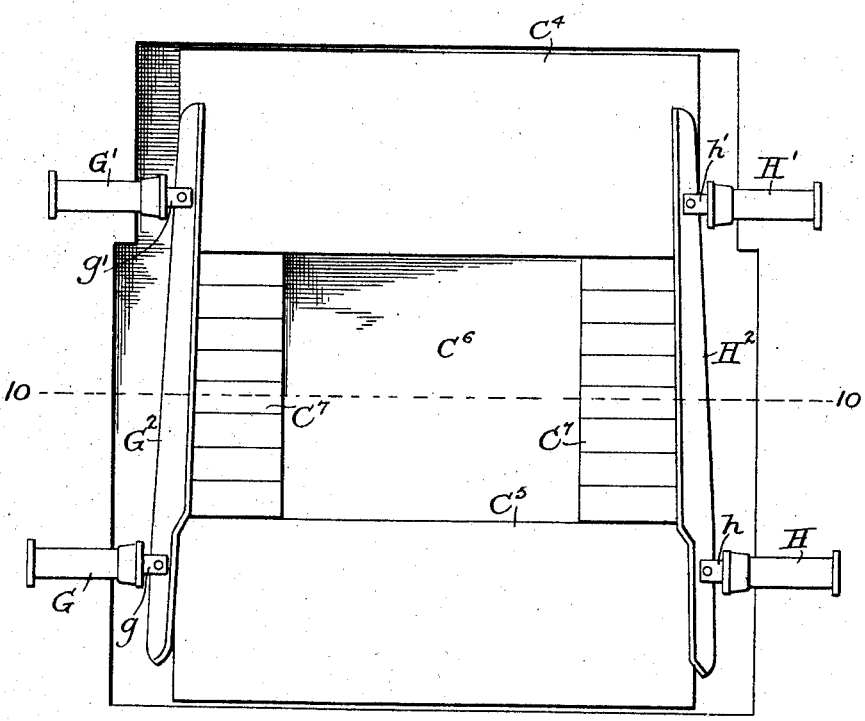
Figure 11:
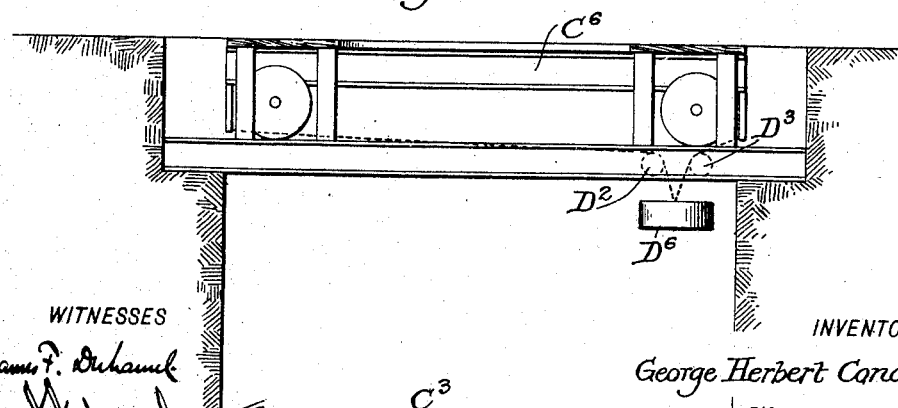

In the accompanying drawings, Figure 1 is an end view in elevation, showing an apparatus for lifting and centering the body of the vehicle. Fig. 2 is also an end elevation and shows another construction of apparatus also for elevating and centering the vehicle. Fig. 3 is a view in elevation, showing a modified construction of apparatus also for centering the body of the vehicle. Fig. 4 is a side elevation, partly in section, showing a vehicle in position upon the loading-table; also, a pair of elevating-rams and the transfer-table and loading-ram, many of the details being omitted for convenience of illustration. Fig. 5 is a plan view of the loading-table and appurtenances. Fig. 6 is a longitudinal sectional elevation on the line 6 6 of Fig. 5, showing the loading-table, its centralizing mechanism, and the elevating-rams. Fig. 7 is a transverse sectional elevation of the loading-table and its centralizing mechanism on line 7 7 of Fig. 6 and showing also a modified arrangement of the vehicle-centering rams. Fig. 8 is an enlarged detailed view of one of the elevating-rams, and Fig. 9 is a similar view of the other elevating-ram. Fig. 10 is a top plan view of the loading-table arranged for loading from below. Fig. 11 is a longitudinal section of the loading-table, Fig. 10, on line 10 10. Fig. 12 is a longitudinal elevation of the transfer-table. Fig. 13 is a plan view of the transfer-table, showing also two loading-rams and portions of two loading-tables. Fig. 14 is a plan view of an automatic circuit-breaker, and Fig. 15 is a side elevation of the same. Fig. 16 is an end view of the transfer-table and loading-ram. Fig. 17 is a plan view of the transfer-table and loading-ram shown in Fig. 16, the transfer-table being contracted for convenience of illustration. Fig. 18 is an end view in elevation of the transfer-table, showing the stop mechanism for positioning the carriers. Fig. 19 is an enlarged detailed plan view, partly in section, showing one of the battery-tray carriers, together with the movable stop for positioning the same. Fig. 20 is an end view of the carrier shown in Fig. 19.

In said drawings, Fig. 1, A is the body of the vehicle to be placed in a predetermined position or centered. The means for accomplishing this, as indicated, comprise a vertically-acting ram or the like, of which B' is the cylinder, and $b$ is the piston or piston-rod. The ram B' is located beneath the place where the vehicle is to be loaded or unloaded. The upper end of the piston $b$ is provided with a cross-head or frame $b'$, having two or more upwardly and outwardly inclined arms $b^2$ $b^3$. The upper ends of these arms are wider than the lower portion of the vehicle, so as to embrace the same, and as the piston $b$ rises will on account of their inclined surfaces move it to one side or the other or forward and backward until it rests upon the intervening frame $b'$, which should be of the proper width to correspond with the width of the body of the vehicle, so as to hold it firmly in position. The arms $b^2$ $b^3$ may be of any desired length and should be long enough to form a bed or support which will sustain the body of the vehicle without strain.

The vehicles usually are supported on springs which vary in tension, so that when resting upon said springs the vehicle-bodies would vary in height. Therefore in centering the vehicle-body, as described, it is also lifted a short distance, as indicated by the dotted lines, bringing it always into the same plane. Two of the rams B' may be employed; but a single one will answer the purpose, being arranged to engage the body of the vehicle between the axles of its supporting-wheels $b^4$ $b^4$.

In Fig. 2 another construction is shown, which comprises two horizontal rams B² B³ on opposite sides of the vehicle. $b^5$ $b^6$ are the piston-rods of said rams, and they are connected at their outer ends to wedge-blocks B⁴ B⁵, which are laterally movable toward and away from the body A' of the vehicle. These wedge-blocks B⁴ B⁵ are arranged to be forced laterally under the body of the vehicle, so that they will lift and sustain the same, as indicated in the dotted lines. They (the wedge-blocks) are also desirably provided with adjustable stops $b^7$, which come up against the sides of the vehicle and force it into central position between them.

Another arrangement of apparatus for centering the body of a vehicle is indicated in Fig. 3, in which two rams $a'$ $a^2$ are each provided with a rocking lever $a^5$ $a^6$, the outer ends of which are connected by suitably-hinged connecting-rods with the outer ends of the piston-rods $a^3$ $a^4$ of the rams $a'$ $a^2$. The inner ends of the rocking levers are provided with extending arms and stops $a^7$ $a^8$. When the vehicle-body $A^3$ is placed between the arms in the positions indicated in the full lines, the rams are operated to draw down the piston-rods $a^3$ $a^4$. This will cause oscillation of the levers $a^5$ $a^6$, bringing their inner ends under the lower edges or bottom of the vehicle-body, raising it between them and centering it, as indicated by the dotted lines. The running-gear is in this instance omitted for convenience of illustration. I have thus shown several constructions of apparatus for centering the body of a vehicle in order to mechanically place it in a predetermined position, so that it can be loaded by mechanical means installed at some particular point, and will describe still other constructions for this purpose, since so far as this important feature of the invention is concerned it makes no difference how the loading or unloading is accomplished or whether the load is applied from below or at the sides or ends of the vehicle. In the accompanying claims, therefore, mechanical means for centering the body of the vehicle to receive or discharge its load is broadly claimed without restriction to the particular arrangement or details of construction present in the devices illustrated in the drawings.

In Fig. 4, $A^4$ is the body of a vehicle to be supplied with a tray of storage batteries. The vehicle has in this instance at its rear end a battery box or receptacle $a$, within which a tray of storage batteries B is indicated in dotted lines. The vehicle is represented as upon a laterally-movable loading-table C, where it has been raised until the battery-box is in the desired horizontal plane with respect to the transfer-table I, to which it is at right angles, with its rear end in close proximity. The loading-ram N is also shown with its piston-rod extended across the transfer-table and engaging the tray of batteries in the vehicle ready to draw the same onto the transfer-table, or, as they have just been loaded, into the vehicle therefrom. One form of the loading-table C, Figs. 5, 6, 7, and 13, comprises a platform large enough to receive all four wheels of the vehicle to be supplied with battery, and it is desirably arranged upon the general floor-level directly in front of the transfer-table and at right angles thereto. The loading-table C is formed in two adjoining parts $C'$ $C^2$, each portion being separately sustained by suitably-journaled carrying-wheels D $D'$ $d$ $d'$, which move upon tracks $d^2$ $d^3$ $d^4$ $d^5$, arranged below and transversely of the table, so that same may move freely to the right or left. Below the loading-table, at or near its center, are journaled two sets of pulleys $D^2$ $D^3$, and two chains $D^4$ $D^5$ are secured, respectively, to the outer portions or opposite sides of the loading-table, whence they pass over the pulleys $D^2$ $D^3$. Their inner ends are both united to a centralizing-weight $D^6$. Each half $C'$ $C^2$ of the loading-table is similarly provided with chains and centralizing-weights, so that if the table has been moved laterally the weights $D^6$, acting through the chains $D^4$ $D^5$, bring it back to normal position, when it is free to be moved thereby. A hydraulic or other elevator E, here shown in the form of a ram, is located in the pit $C^3$ under the forward portion $C'$ of the loading-table in position to engage and raise the end of the vehicle upon that part of the table. $E'$ is the cylinder of the ram elevator, which is provided with the piston $e$, to the upper end of which is pivotally connected a cross-head $e^7$. Vertically-moving rods $e^3$ $e^4$ in suitable guides $e^5$ $e^6$ are hinged to the outer ends of the cross-head $e^7$ and provided at their upper ends with recessed blocks $e'$ $e^2$, which are spaced so as to fit around the corners of the body of the vehicle, so as to do the least injury thereto and at the same time to hold the same securely between them to prevent displacement during the operation of loading. The forward part $C'$ of the loading-table is formed with a large opening $E^2$ above the forward elevator E just described sufficiently large to permit it to pass upward therethrough in any position which the table can assume, and the said opening $E^2$ is closed by a number of small independent doors $E^3$, which are arranged close together, so as to effectually cover said opening when the ram is down, only so many of them being elevated by the ram in its upward movement as are necessary to allow it to pass through, thus avoiding the difficulty attending the use of a single large door. The doors $E^3$ are preferably of metal or may be weighted to insure their closing by gravity when the elevator is lowered. F is a second hydraulic elevator, of which $f$ is the cylinder, and $f'$ the piston. This elevator is located under the back part of the loading-table, passing upward through a permanent opening $F'$ therein, which is directly under the rear end of the battery-box when the vehicle is in position. The piston $f'$ is provided with two arms $f^2$ $f^3$, in the outer ends of which are pivoted stirrups $f^4$ $f^5$, which are arranged to connect with other arms which extend from the transfer-table and engage parts of the vehicle. In their retracted positions the parts connected with the elevators E F are below the general level of the loading-table and do not interfere with the placing of the vehicle thereon. G $G'$ and H $H'$ are hydraulic rams placed on opposite sides of the loading-table C, but independent thereof. The pistons $g$ $g'$ of the two rams on one side of the table are pivotally connected to a bar $G^2$, and the pistons $h$ $h'$ of the opposite pair of rams are similarly secured to a corresponding bar $H^2$. Counterweights $g^2$ $g^3$ $h^2$ $h^3$ are connected with the bars $G^2$ $H^2$ by chains $g^4$ $h^4$, running over suitable pulleys, and serve to draw back the bars $G^2$ $H^2$ and pistons thereto connected when the pressure is withdrawn from the rams. In the present instance single-acting rams are shown; but double-acting rams may be substituted therefor and the counter-weights dispensed with. When the bars $G^2$ $H^2$ are fully drawn back, the bar $H^2$ being so indicated in dotted lines, a vehicle to be loaded with battery can be readily run onto the loading-table, and when said vehicle has been so placed upon the table as nearly as may be the bars $G^2$ $H^2$ are moved forward by the rams until they engage the hubs or other projecting parts of the vehicle, when by continued movement one or other of the bars $G^2$ $H^2$ pushes it, (the vehicle,) together with the loading-table, into the desired position with respect to the transfer-table and the loading-ram.

While in some instances I may prefer the precise arrangement just described, one of the sets of rams may be dispensed with, as indicated in connection with Fig. 7, where the ram G and bar $G^2$ of Fig. 5 are shown, as indicated in said Fig. 5; but the opposite set of rams H H' are omitted and replaced by an adjustable rail $H^4$, which takes the place of the bar $H^2$ and is adjusted into the desired position by means of screws $h^5$ passing through suitable supporting-posts $H^3$. The rail $H^4$ is adjusted to such a point that when vehicles of the same size are pushed over against it by the rams G G' on the opposite side of the table they will be in the desired position.

Great damage would undoubtedly result to the special tires with which many of the vehicles are provided if they were pushed across the table into loading position. A particular feature of my invention—the laterally-movable loading-table—entirely overcomes this difficulty, so that when the side rams are brought into action the bars, which are of suitable dimensions, push against the vehicle and move it, together with the loading-table, to one side or other, as may be needed to secure exact position. Having been centered or brought to the predetermined position by the action of the rams through the bars $G^2$ $H^2$, the vertically-moving elevators E F are then brought into play to raise the vehicle a short distance until the battery-box is in the desired horizontal plane, while at the same time the vehicle is suspended immovably upon the elevators and between the bars $G^2$ $H^2$ of the centering-rams. In this position the work of the transfer-table and its auxiliaries begins.

Before describing the transfer-table it should be noted that, as indicated in Figs. 10 and 11, the loading-table may be modified to admit of the load being applied to the vehicle in a vertical plane instead of in a horizontal plane. The two portions of the table C, Fig. 5, are shown in Figs. 10 and 11 as separated parts $C^4$ $C^5$, between which exists an opening $C^6$ into the pit $C^3$, in which may be rails to carry the elevator transfer-car. Parts $C^4$ $C^5$ of the divided loading-table are provided with carrying-wheels and centralizing devices, as already described, and the single or double centering-rams may be employed, as preferred, the rams, as indicated, being substantially as in Fig. 5, but are omitted from Fig. 11. Suitable flooring $C^7$ is placed at the margins of the opening $C^6$ on the same general level as the rest of the table to support the wheels of the vehicle in passing, and said flooring is sufficiently wide to prevent the wheels from entering the pit.

The transfer-table I is a narrow framework of any desired length, in the present instance shown as sufficiently long to accommodate two loading-tables in front of it and fitted to carry eight trays of batteries. The transfer-table I is provided with two tracks or ways $i$ $i'$ on its upper portion. Upon these tracks travel carriers J, which are strong metallic frames extending across the table I and provided with small wheels or rollers $j$ $j'$, which run on tracks $i$ $i'$. These carriers are all attached to suitable link belts or chains K K', which run upon sprocket-wheels L L' at opposite ends of the table I. The carriers J are secured in pairs to the chains K K' and are at such a distance apart that a tray of storage batteries of uniform size will rest upon them and be securely held laterally, but free to be moved endwise between the prongs $k$, with which the carriers are provided. The chains and carriers constitute an endless belt, and in addition to being moved forward and back loaded may travel the entire circuit of the machine. In order to support the weight of the carriers when it is found necessary to run them under the table, I provide a second set of supporting-rails $i^2$ $i^3$ at a suitable distance below the top of the table to support a set of carriers in an inverted position through their wheels $j$ $j'$ without undue strain upon the chains K K'. The sprocket-wheels L L', of which there is a set at each end of the table I, are carried upon shafts $L^2$, which are sustained in suitable bearings $l$ $l$, secured to the table. The sprocket-wheel shafts $L^2$ are provided at their outer extremities with beveled-gear driving-pinions $L^3$, which are in mesh with the driving-pinions $l'$. The chains K K' are driven back and forth through the sprocket-wheels, driving gears and pinions, and driving-shaft $m$, to which power may be furnished from any suitable source, that illustrated comprising an electric motor M, the armature-shaft of which is provided with a pinion $m'$, which engages a driving-gear $L^4$ upon the shaft $m$. Directly opposite to the battery-box of the vehicle to be loaded or unloaded when it has been centered or positioned as described and upon the opposite side of the transfer-table is placed the loading-ram N, the cylinder $n$ and piston-rod $n'$ of which are of such length as to extend entirely across the transfer-table, so as when fully extended to push the tray of battery into the vehicle or withdraw it therefrom. The piston-rod $n'$ is provided with a pair of hooked arms O O', hinged thereto and provided with hooks at their outer extremities corresponding with and adapted to engage catches $p\ p$ upon the battery-tray B. The hooked arms O O' are connected by a bail $O^2$, which extends over the front end of the loading-ram in position to be conveniently reached by the operator for lifting the said arms whenever desired, as indicated in Fig. 16. This bail $O^2$ is broken away in Fig. 17 for convenience of illustration. Upon the opposite side of the transfer-table I is a frame or bridge P to span the space between the transfer-table and the vehicle. At the ends of said bridge are two arms $P'\ P^2$, formed with notches $P^3$ near their outer extremities, which are adapted to fit under a bar or bolster Q, with which the vehicle is provided, to prevent the vehicle moving while the battery is being handled. Rollers $q$ are mounted in bridge P and help to support the battery-tray in its passage to or from the battery-box and transfer-table. The stirrups $f^4\ f^5$ in the ends of the arms carried by the piston $f'$ correspond with the arms $p'\ p^2$, and when said piston is raised they fit into and engage the notches $p^4$ under the ends of said arms, raising them and the end of the vehicle, as indicated in Fig. 16. R R' are tappets arranged in the path of one of the hook-arms O O' for raising them and disengaging the hooks when the tray has been pushed into the battery-box, and vice versa. The tappets R R' are carried upon stems $r\ r$, the lower ends of which rest upon rock-arms $r'$, which are attached to the ends of a rock-shaft $R^2$, which is suitably journaled upon the frame of the transfer-table and provided with an actuating-lever $R^3$, connecting with a foot-lever $r^2$ in position to be reached by the operator, and which may of course be replaced by a hand-lever, if preferred. Figs. 14 and 15 show an automatic circuit-breaking switch, one of which is placed at each end of the conveyer-table in the circuit supplying the motor M, by which the transfer-table is operated. A pivoted lever S is normally held in position to close the switch by spring $s$. A suitably-insulated stationary contact is indicated at $s'$, and $s^2$ is the other contact, which is attached to the rocking lever T and engages the stationary contact $s'$. The lever T is connected with the lever S by a connecting-rod $t$. One pole of the supply-circuit is connected to the switch, as shown at 1 and 2, so that the current will be entirely cut off from the motor when the switch is open. The lever S is provided with an extension S', which is located in the path of the tray of batteries carried on the transfer-table, so as to be automatically thrown and the switch opened when the tray has arrived at the limit of travel, thereby cutting the current off from the motor and stopping the conveyer, thus preventing the tray from being carried over the ends of the conveyer. The carriers are held in desired position with respect to the vehicle by a stop-pin T', Figs. 18, 19, and 20. This pin is mounted in a suitable counterbored block U, secured upon the frame of the transfer-table I. An actuating-spring $t'$ is placed behind the pin T', a spindle $u$ extending therefrom through the end of the block and being there pivotally connected to a rocking lever V. The lever V is journaled in suitable supports W, also secured to the transfer-table, and for convenience of operation is connected by the rod $w$ with the releasing-lever Y, which is pivotally mounted in the support $y$, secured to the opposite side of the transfer-table and within convenient reach of the operator. Each one of the carriers is formed with a hole Z, adapted to receive the stop-pin T', and the portions on the end of the carrier $y'\ y^2$ in the same horizontal line with the opening Z are sloped off, as indicated in dotted lines in Fig. 19, to afford an easy path for the end of the stop-pin T', which, however, can be retracted whenever desired by the lever Y.

It will be apparent that in view of the foregoing description many of the details of construction of the apparatus embodying my new and improved system of loading and unloading storage batteries may be altered to secure similar results without the exercise of invention, and I therefore do not limit myself to the details of construction through which I have pointed it out, the same being indicated in the appended claims.

Having described my invention, what I claim is—

1. In combination a stationary load-moving apparatus, a vehicle-centering apparatus in fixed relation thereto, and adapted to center a dirigible vehicle, and an intermediate movable load-conveyer.

2. The combination with a dirigible vehicle to be loaded and with loading apparatus, of mechanism for acting mechanically against the vehicle to force it in any direction and into desired position with respect to the loading apparatus.

3. The combination with a dirigible vehicle to be loaded and with loading apparatus, of stationary mechanism adjacent to the loading apparatus, adjacent to which the dirigible vehicle is placed, said mechanism adapted to act against the vehicle to move the same in any desired direction into position for loading.

4. The combination with a dirigible vehicle to be loaded, of mechanism for placing the same in the desired position, and moving carriers adapted to place the object to be loaded upon the vehicle while in the desired relation thereto.

5. The combination with a dirigible vehicle to be loaded, of mechanism for placing the same in desired position, and a transfer-table provided with moving carriers adapted to receive and move the object to be placed upon the vehicle into the desired relation thereto.

6. The combination with a dirigible vehicle to be loaded, means for placing the vehicle in the desired position, moving carriers adapted to receive and move the object to be placed upon the vehicle in the desired relation thereto, and stationary means for forcing said object onto the vehicle or withdrawing it therefrom.

7. The combination with a dirigible vehicle to be loaded, of a laterally-movable loading-table adapted to receive and support the vehicle and means for moving the vehicle and table together laterally to a predetermined position for loading the vehicle.

8. The combination with a dirigible vehicle to be loaded, of a laterally-movable loading-table adapted to receive the vehicle, and means adjacent to the loading-table arranged to engage the vehicle to move it together with the table into the predetermined position with respect to the positioning devices.

9. A storage-battery loading and unloading apparatus, comprising a dirigible vehicle to be loaded and means for moving the vehicle in any needed direction into a predetermined position, a carrier arranged to support and move the load into juxtaposition to the positioned vehicle, and a ram or the like, arranged to engage the load and to push it into or draw it from the vehicle.

10. The combination with a dirigible vehicle to be loaded, of a laterally-movable loading-table and a ram or rams at the side thereof, said ram or rams adapted to engage the vehicle upon the table to move said vehicle laterally together with the loading-table into the central or loading position.

11. The combination with a loading-table adapted to receive a road-vehicle to be loaded, of a transfer-table arranged at right angles thereto and provided with laterally-moving carriers adapted to receive and to move the object to be placed upon the vehicle into the desired relation thereto.

12. A storage-battery loading and unloading apparatus comprising a dirigible vehicle to be loaded, a table adapted to receive the vehicle and to be moved laterally together therewith, means for moving the table and vehicle together laterally into a predetermined position, a carrier arranged to support and to move the load into juxtaposition to the positioned vehicle and means for mechanically pushing the load into the vehicle or withdrawing it therefrom.

13. The combination with a loading-table, a dirigible vehicle thereon to be loaded, a transfer-table at right angles to the loading-table, traveling carriers upon the transfer-table, said carriers adapted to receive and convey the load for the vehicle and to sustain the same in the desired horizontal position with respect thereto, and a loading-ram on the opposite side of the loading-table and in line with the receptacle upon the vehicle, and means for operating the ram to force the load into the vehicle or withdraw it therefrom.

14. The combination with a vehicle to be loaded, of a laterally-movable loading-table adapted to receive the same and subdivided to separately sustain the separate sets of wheels of the vehicle.

15. The combination with a dirigible vehicle to be loaded, of a laterally-movable loading-table and means for automatically returning said table to a predetermined position.

16. In combination in vehicle-loading apparatus, a dirigible vehicle, a platform to receive said vehicle, and means of support or suspension for said platform to automatically permit lateral adjustment of said vehicle.

17. A loading-table adapted to receive the four wheels of a vehicle and constructed in two parts adapted to support the front and rear wheels respectively, supports upon which each portion of the loading-table moves laterally, and means connected with each portion of the loading-table for automatically returning the same to normal position.

18. The combination with a vehicle to be loaded, of a loading-table adapted to receive the four wheels thereof, said table being subdivided to separately sustain each pair of wheels, suitable supporting-wheels and tracks therefor for the table, and means for automatically returning the table to predetermined position when the vehicle is removed.

19. A loading-table comprising front and rear portions, suitably-journaled supporting-wheels for each portion, tracks for sustaining the supporting-wheels and a centering-weight for each portion of the table, said weight being connected by chains to both ends thereof for automatically returning the same to predetermined position.

20. The combination with a vehicle to be loaded, of a transfer-table and moving carriers thereon for positioning the load, an extension or bridge attached to the transfer-table and hinged arms connected with the bridge and adapted to engage the vehicle, thereby connecting the transfer-table therewith.

21. The combination with a vehicle to be loaded, of a transfer-table and movable carriers thereon, an extension or bridge adapted to engage the vehicle and to connect the transfer-table therewith, and a stop arranged to engage the carrier upon the transfer-table when in desired position with respect to the bridge and vehicle.

22. The combination with a loading-table, a vehicle thereon, a transfer-table at right angles thereto and provided with movable carriers adapted to sustain a load for the vehicle, of an extension or bridge projecting from the transfer-table, hinged arms connected with the bridge and extending under the vehicle, a hoisting-ram adapted to engage said hinged arms and to raise them together with the portion of the vehicle engaged thereby to bring the end of the vehicle and the bridge into the desired horizontal plane with respect to the load upon the carrier.

23. The combination with a trackless loading-table and a dirigible vehicle thereon, of a vertically-moving ram or rams located below the table and adapted when raised, to engage the vehicle, and to lift the same into the desired position.

24. The combination with a loading-table and a road-vehicle thereon to be loaded, of an elevating-ram located below said table and provided with recessed blocks adapted, when said ram is elevated, to engage, lift and hold the body of the vehicle in desired position.

25. In combination, a vertically-moving elevating device, a laterally-movable loading-table above the same and having an opening therein through which the elevating device can pass upward, and a plurality of hinged metallic or weighted covers for closing said opening.

26. The combination with a loading-table, a transfer-table adapted to sustain the load, an elevating-ram arranged to engage the portion of the vehicle farthest from the transfer-table and located below the same, an opening in the table above the ram and a plurality of hinged metallic or weighted covers for closing said opening, whereby the elevating device is adapted to pass upward through the loading-table raising the covers above it.

27. The combination with a dirigible vehicle to be loaded and centering apparatus therefor, of a loading-ram adjacent to the centering apparatus and provided with gripping devices connected with its moving part and adapted to engage the load to be placed upon or withdrawn from the vehicle.

28. In combination with the transfer-table, vehicle and centering apparatus, a loading-ram adjacent to the transfer-table and located opposite to the centering apparatus, gripping devices connected with the piston-rod of the loading-ram and adapted to engage the load, and automatic tripping devices for the gripping apparatus adapted to disengage the same from the load at the desired point and means for manually operating the tripping devices as desired.

Signed by me at New York, N. Y., this 18th day of October, 1898.

GEORGE HERBERT CONDICT.

Witnesses:
FRANKLAND JANNUS,
W. L. MURRAY.